Sept. 5, 1939.   L. O. REICHELT   2,171,993
STRAND HANDLING APPARATUS
Filed April 10, 1937   3 Sheets-Sheet 2
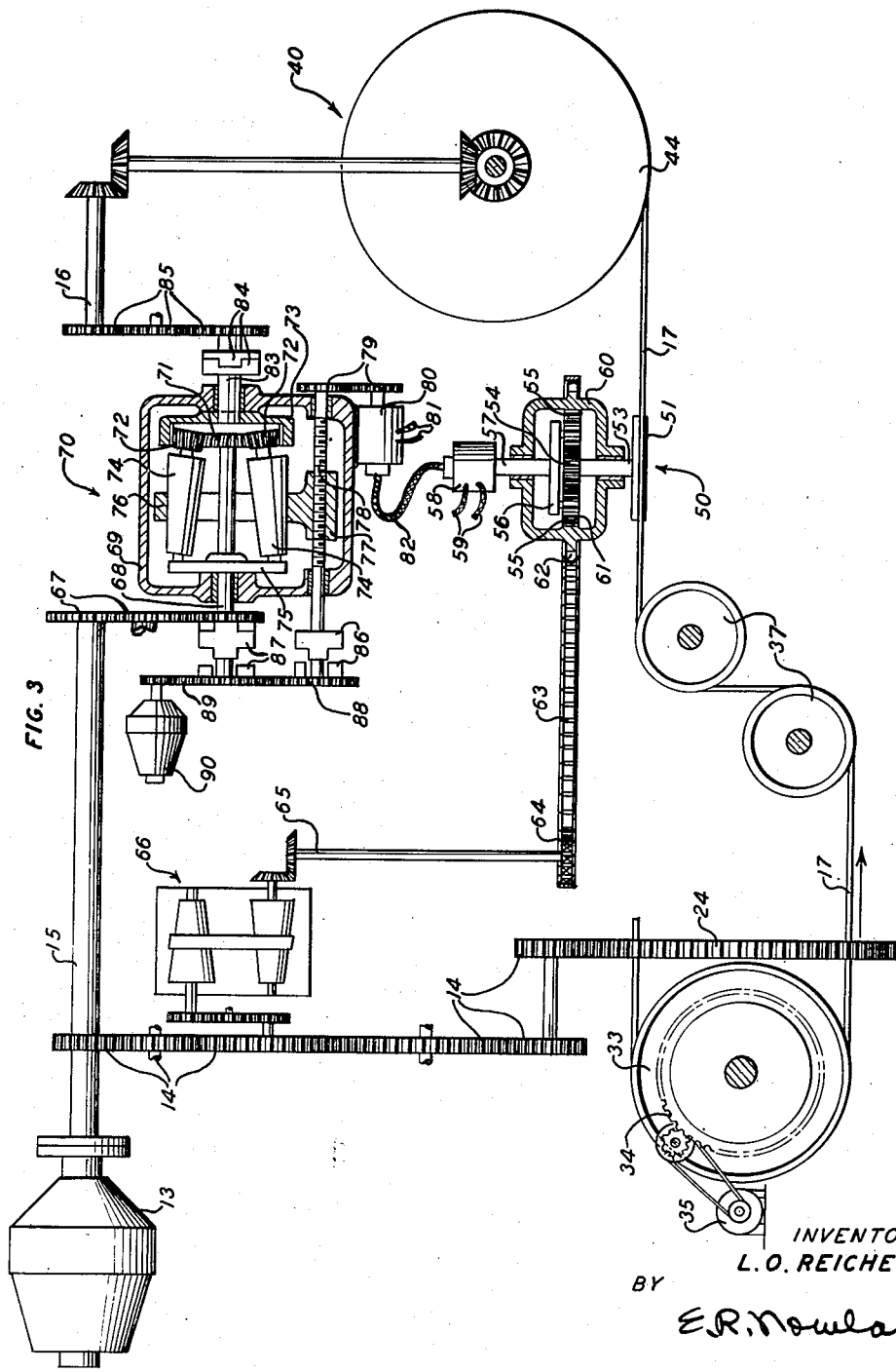
INVENTOR
L. O. REICHELT
BY
E. R. Nowlan
ATTORNEY

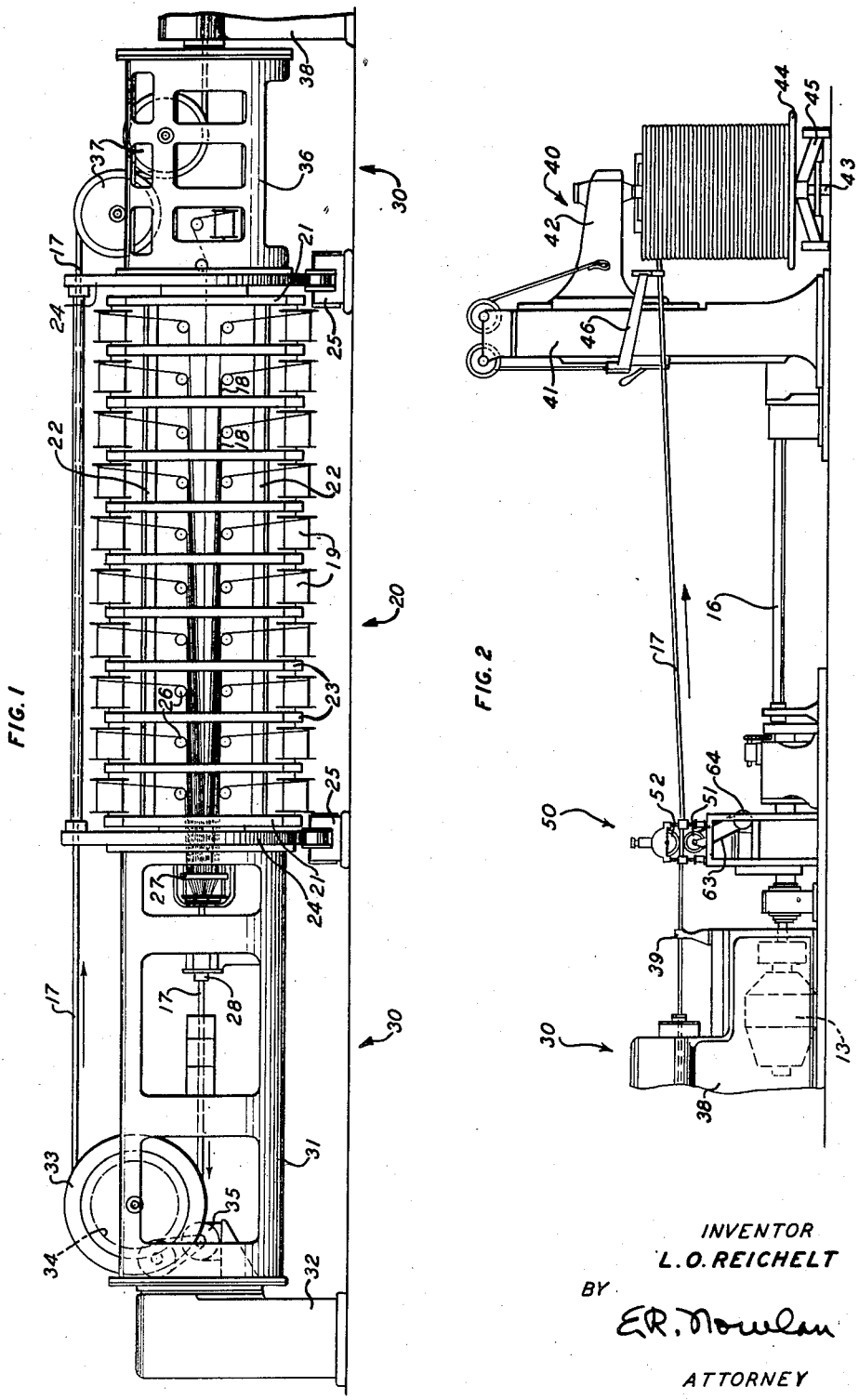

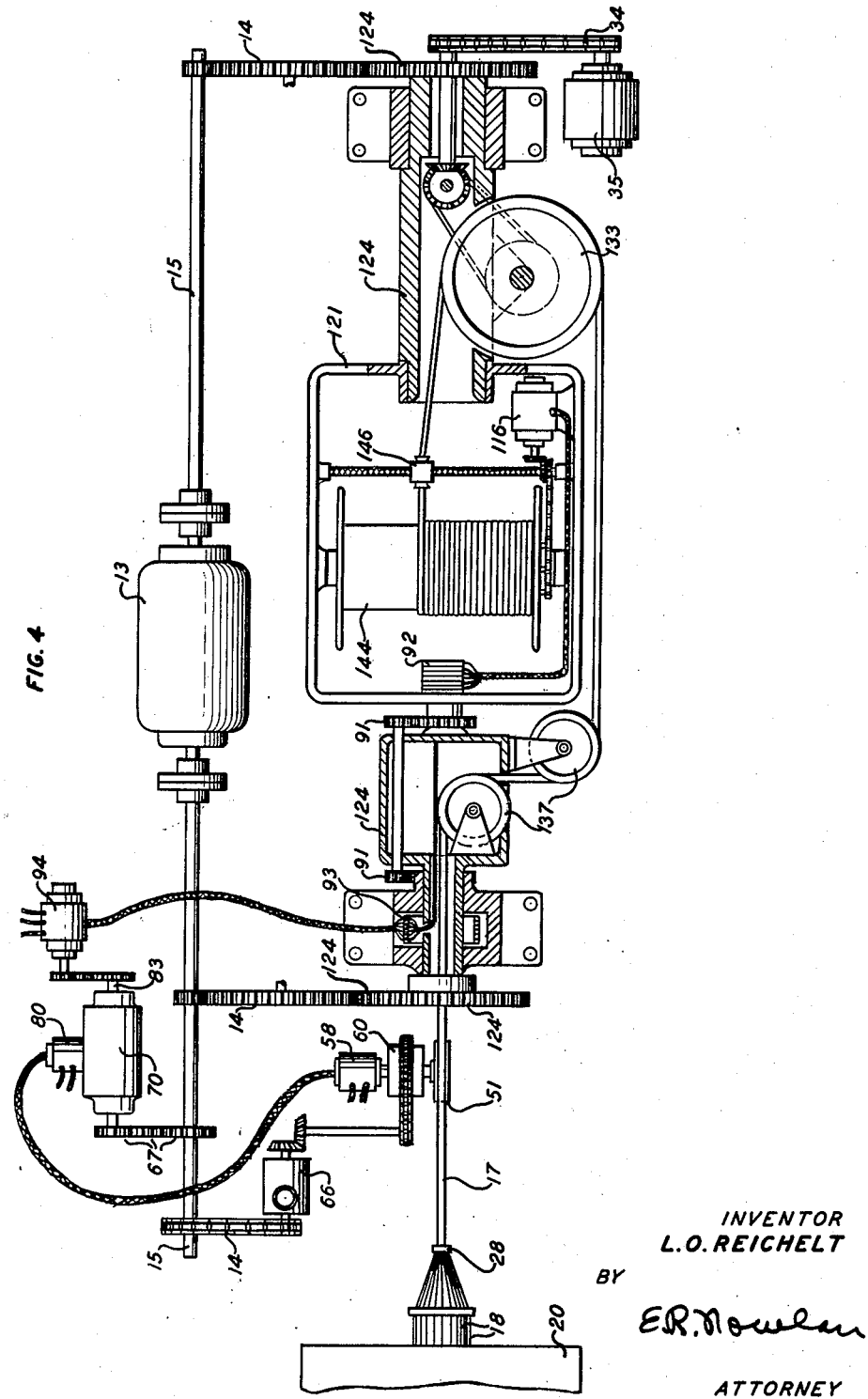

Patented Sept. 5, 1939

2,171,993

UNITED STATES PATENT OFFICE 2,171,993

STRAND HANDLING APPARATUS

Lester O. Reichelt, Cranford, N. J., assignor to Western Electric Company, Incorporated, New York, N. Y., a corporation of New York Application April 10, 1937, Serial No. 136,097

19 Claims. (Cl. 57—58)

This invention relates to strand handling apparatus and more particularly to apparatus commonly called "stranders" for combining strands by intertwisting them into cables such as may be used in the mechanical arts and in the electrical communications arts.

In the manufacture of cables comprising intertwisted strands, an apparatus may be employed comprising means to support a plurality of strand supply reels at one end of the apparatus and means at the other end to take-up or wind the completed cable on a take-up reel. With these must then be combined some means to intertwist the strands and some means to advance the strands and cable from the supply reels to the take-up reel. Frequently the intertwisting means will be some arrangment to revolve either the plurality of supply reels or the take-up reel or both in a plane transverse to the axis of advance of the group of strands or of the cable or to revolve the group strands or the cable about either the supply or the take-up; while a capstan or equivalent device is used to advance the cable. The rate of twist per unit length or pitch of the completed cable will then depend upon the relative speed of revolution of the twisting means and the linear speed of the advancing means, and in order to produce cable of uniform and predetermined lay it will be necessary to maintain the ratio of these two speeds at a constant value however the individual speeds may be necessarily varied. Since the completed cable is taken up on a reel which is rotated on its own axis to wind cable thereon and so builds up a body of cable which increases in diameter stepwise as each layer of winding is completed, and since the cable must preferably advance to and upon the take-up reel at constant linear speed, the take-up reel must be driven at a step-wise diminishing rate of rotation.

An object of the present invention is to provide a strand handling or cabling apparatus in which the take-up means is also the principal strand advancing means eliminating the necessity for a capstan or the like advancing means independent of the take-up.

One embodiment of the invention contemplates a strander or cabling machine in which strands from a substantially stationary plurality of supply reels are led into a flier to a driven take-up reel which is also the principal means to advance the strands and cable linearly; and in which machine means are provided operated by the advancing cable to regulate the speed of the take-up driving means.

Other objects and features of the invention will appear from the following detailed description of two embodiments thereof taken in connection with the accompanying drawings in which the same reference numerals are applied to identical elements in the several figures and in which Fig. 1 is a diagrammatic view of the front half of a strander or cabling machine constructed in accordance with the invention;

Fig. 2 is a continuation of Fig. 1 similarly presenting the second half of the same machine;

Fig. 3 is an enlarged diagrammatic view of the take-up speed control mechanism, and Fig. 4 is a diagrammatic view of the control and take-up of a second form of strander.

The embodiment of the invention disclosed in Figs. 1, 2 and 3 is a strander comprising strand supply means and strand intertwisting means shown principally in Fig. 1, the strand supply means being generally indicated by the numeral 20 and the intertwisting means by the numeral 30, take-up means shown principally in Fig. 2 and generally indicated by the numeral 40, and interposed between 20—30 and 40 a take-up speed control means, best shown in Fig. 3 and generally indicated by the numeral 50.

The strand supply means 20 may be of any appropriate construction and arrangement, here shown as a roughly cylindrical, horizontal cage comprising vertical circular annular or perforated disk like ends 21, 21 between which extends a plurality of parallel horizontal ties 22, 22 carrying transverse annuli or disks 23, 23 between which individual strand supply reels 19, 19 are mounted. This cage is normally stationary, the ends 21, 21 being journalled in rotary members 24, 24 which may rotate around the ends 21, 21, running externally on rollers 25, 25 supported the floor or other base. Guide sheaves 26, 26 are mounted within the cage near its axis, one such sheave for each reel 19, which serve to allow the strands 18, 18 to be drawn from the reels radially inwardly of the cage and then to be led axially along and out of the cage.

The rotatable member 24 on the left carries rigidly mounted thereon a housing 31 supported at its outer end by being journalled in a pedestal 32. A distributor plate 27 is mounted on the end plate 21 and extends into the housing 31 while a compacting or twisting die 28 is mounted in the housing to rotate therewith. The strands 18 are guided through individual perforations in the distributor plate, brought together and pass through the die and thence over the large flier sheave 33, being intertwisted on emerging from the die 28 to form the cable 17.

The sheave 33 may be formed with a gear 34 in order to be driven by a motor 35 mounted in the housing 31, this motor 35 being only a booster and being subordinate in effect and in power to advance the strands to the take-up means 40.

The rotatable member 24 on the right carries a housing 36 whose outer end is rotatably supported in a suitable standard 38. The cable 17 passes from the sheave 33 over free running guide sheaves 37, 37 mounted in the housing 36 to emerge axially of the housing through a suitable aperture in the standard 38 and thence through a stationary compacting or twisting die 39 mounted on the standard, the cable receiving a second twist in passing from the housing 36 to the die 39.

All of the mechanism thus far described is only described so far as necessary for an understanding of the present invention, its detailed construction and mode of operation being no part of the present invention. Suitable mechanism, structure and means for this part of the apparatus are fully disclosed and described in U. S. Patents 1,813,197 and 1,956,730 issued July 7, 1931, and May 1, 1934, to Lester O. Reichelt.

From the die 39 the now fully formed cable passes via the control apparatus 50 to be described hereinafter, to the take-up means 40. This take-up apparatus comprises a stationary pedestal 41 having a vertically movable horizontal arm 42 in the outer end of which is mounted a member to enter and steady the top of a take-up reel 44 rotatably mounted upon a removable truck 45 and which is engaged and driven by the shaft 43, which in turn is driven by mechanism not shown from a drive shaft 16. A vertically reciprocating distributor 46 also carried by the pedestal 41 serves to guide the cable 17 into compact even layers on the reel 44, and is also driven by mechanism not shown from the shaft 16. All of this take-up apparatus is also no part of the present invention so far as its construction and mechanism is concerned. Appropriate structure for this apparatus is disclosed and described in detail in U. S. Patent 1,673,284 issued June 12, 1928, to J. C. Hodge.

For the present purpose it is sufficient that the cable formed in the apparatus of Fig. 1 is taken up by the apparatus 40 at a longitudinal speed dependent directly upon the speed of the shaft 16 and inversely upon the diameter of the body of cable wound up upon the reel 44, and that the flier composed of the sheaves 33, 37, 37 revolves at constant angular speed about its axis. The rotary drive of the flier comes directly, as shown only in Fig. 3, from the main drive shaft 15 of the apparatus through intermediate gears 14, 14, the shaft 15 being driven at constant speed by a suitable constant speed motor 13.

Between 20 and 40 the cable 17 runs over and drives a wheel 51 preferably assisted by a complementary opposed pressure sheave 52. The wheel 51 drives a shaft 53 on which is rigidly secured a sun-gear 54, which engages two (or more) planetary gears 55, 55 rotatably mounted in a yoke 56. This yoke is rigid with and can drive a shaft 57 which is directly or indirectly coupled to the rotor shaft of an electrical generator 58. The rotor of this generator is preferably a star wound three phase rotor. The field is preferably two phase and is fed from some outside source, not shown, through leads 59.

The planetary gears 55 also engage a ring gear 61 formed on the inner side of a rotatable ring or housing 60. A sprocket 62 formed on the outer periphery of the housing 60 is engaged by a chain 63 running over a sprocket 64 mounted on a shaft 65. The shaft 65 is driven as shown through any suitable change speed mechanism 66 from one of the gears 14.

The shaft 15, through gears 67, 67, drives the input shaft 68 of a variable speed transmission generally indicated at 70 contained in a housing 69. The shaft 68 drives a sun gear 71 engaging two or more planetary gears 72 which in turn engage a ring gear 73. A friction cone 74 is integral or rigid with each of the planetary gears 72 and is also journalled for support in a spider 75 freely rotatable on the shaft 68. The several cones 74 are so mounted on the planetary gears 72 and in the spider 75 that the outermost straight line generators of their conical surfaces are always mutually parallel. A friction ring 76 surrounds and is in contact with these cones at all times. This ring 76 is integral with or rigid on a nut 77 which runs on a screw 78 mounted in the housing 69. The outer end of the shaft or screw 78 at the right is connected through gears 79 to be driven by the rotor of an electric motor 80 conveniently supported on the housing 69.

The motor 80 has a star wound three phase rotor and a single phase field. The field is fed with single phase current from a source not shown through leads 81. The windings of the rotors of the motor 80 and the generator 58 are connected to each other by a three conductor cable 82.

The ring gear 73 is mounted on and drives the output shaft 83 which in turn by way of a clutch 84 and gearing 85, 85, drives the shaft 16 and thus the cable take-up 40.

The left ends of the shafts 78 and 68 are respectively connectible through clutches 86 and 87 to intermeshed gears 88 and 89 which can be driven by an auxiliary motor 90.

To describe the operation of the above apparatus, let it be assumed that the apparatus is running in normal fashion and that the state of affairs is that generally shown in Figs. 1 and 2 where a layer of finished cable being wound on the reel 44 lacks only two or three turns of being complete. The reel 44 is then being driven in rotation to wind cable from the shaft 16 through the variable speed device 70 from the main drive shaft 15 and motor 13; and the rotary speed of the reel 44 is constant. The reel 44 by its winding action is the principal means for advancing the cable 17 and the strands 18 through the apparatus. It may be the sole means in the manufacture of steel wire cable and the like for mechanical uses, which will endure the pressure of winding without harmful deformation, and in such case, the gear 34 and motor 35 may be dispensed with. In other cases, such as the relatively delicate cables for electrical arts, it may be desirable to include the gear 34 and motor 35 as a booster. However, even in the latter case it is evident that the linear speed of the cable to and from the final and determinative twisting die 39 depends solely upon the rotary speed of the reel 44 during the winding of any one complete layer of cable thereon.

The rotary speed of twisting depends solely upon the rotary speed of the flier 33, 37, 37 and this is constant because of the constant speed drive of the flier from the shaft 15 via the gears 14, 14, 24. Hence, so long as the linear speed of the cable is constant, the pitch and lay of the cable are constant.

The housing 60 and with it the ring gear 61 are driven at a certain constant but adjustable speed from the shaft 15 via gears 14, 14, change speed mechanism 66, and elements 65, 64, 63 and 62. The sun gear 54 is driven by the wheel 51 running on the cable 17. The device 66 has been adjusted so that while the cable is advancing at the desired linear speed, the planetary gears 55 running between the sun gear and the ring gear are held stationary in space and transmit no motion to the shaft 57. If the apparatus were to make cable of one pitch only, the change speed device 66 could be omitted; it is included however to permit of predeterminedly varying the pitch.

Normally, the clutch 86 is open, disconnecting the shaft 78 from the gear 88; and the clutch 87 is set to disconnect the shaft 68 from the gear 89 and connect it through the gears 67, 67 to the constant speed shaft 15 to be driven thereby. Under these conditions, the shaft 68 drives the sun gear 71 and so the planetary gears 72 and the friction cones 74. The latter roll on the inner surface of the friction ring 76 at a speed dependent upon the diameter of the cones at their contact with the ring and hence dependent also upon the position of the ring and its nut 77 on the shaft 78. The cones then through the differential effects of the sun gear 71 and the ring 76 drive the ring gear 73, shaft 83 and so ultimately the reel 44 at a speed dependent upon the position of the nut 77 on the shaft 78. When the apparatus is running normally, as assumed, the shaft 78 is stationary and the nut 77 and ring 76 are stationary, all the elements involved being so proportioned that the flier and take-up are being driven at the relative speeds to produce cable of the desired pitch.

Now assume that the layer of cable being wound is completed and another layer is begun superimposed on the completed layer. There is an abrupt change in size of the body of cable on the reel equivalent to an increase in radius by the thickness of the cable with a consequent proportional increase in linear speed of the cable over the wheel 51. The increased speed of this wheel is immediately converted by the mechanism in the constant speed housing 60 into rotation of the shaft 57 and consequent rotation of the rotor of the generator 58. Current passes thence to the rotor of the motor 80 and is converted into motion of the gears 79 and shaft 78. The nut 77 is moved along the shaft 78, carrying the ring 76 with it and thus altering the speed ratio of the shafts 68 and 83 until the linear speed of the cable and therefor the rotary speed of the wheel 51 are back to normal; and the operation continues until the new layer is completed and another begun, when the same automatic adjustment is effected.

When a reel 44 is filled, the entire apparatus is stopped, the reel 44 disconnected from its drive 43, removed and replaced by an empty reel. The apparatus may then be started again and the control mechanism 60, 70 will speedily return the speed ratio of the shafts 15 and 16 to the high value required by the small winding radius of the empty reel. However, in some instances it may be desired to make this adjustment before restarting the apparatus. Hence while the apparatus as a whole is quiescent, the clutch 84 may be uncoupled, the clutch 88 coupled and the clutch 87 uncoupled from the gear 67 and coupled to the gear 89. The little auxiliary motor 90 may then be used to run the device 70 swiftly back to its proper empty spool setting.

In the disclosure of Fig. 4, the invention is embodied in a modified form. Here the strand supply 20 is stationary as before. The cable 17 passes from the first twisting die 28 over the wheel 51 and into a flier comprising elements 124, 137, 137, 133 and 124. In practice the two members 124 will preferably be mechanically connected by a guide tube or protection for the cable between the sheaves 137 and 133; hence the two elements 124 shown are really preferably one thing and so have one reference numeral. In any case both are driven in synchronism from the constant speed shaft 15.

The cable passes from the sheave 133 via a distributor 146 to a take-up reel 144 removably mounted in a frame 121 journaled on the members 124 and held stationary by planetary gearing 91 of the kind usual for such purposes. The reel 144 is driven in rotation and the distributor 146 in reciprocation by a motor 116 mounted in the frame 121 and fed with current through slip rings 92 and 93 from a generator 94 direct geared to the output shaft 83 of the variable transmission 70.

The generator 94 and motor 116 have independently excited three phase field windings; and they have three phase wound rotors directly connected to each other.

The fact that, in this apparatus, the twisting means, i. e. the flier 124, 137, 133, 124, is positioned to rotate about the take-up instead of about the supply does not alter the principle of operation so far as the invention is concerned, for this flier still runs at constant rotary speed and therefor the pitch of the cable depends upon its linear speed, which is self-controlled as before, through the wheel 51 and the variable transmission 70. In the present instance driving power for the take-up is transmitted from the output shaft 83 of the device 70 to the take-up by the electrically interlocked elements 94 and 116 instead of the mechanically interlocked gearing of Fig. 3.

It is to be noted that, in each of the above machines, the drive of the take-up reel is positive. The rotary speed of the reel is always in a constant ratio to the rotary speed of the shaft 15.

It will be self-evident that the electrical drive of the disclosure of Fig. 4 comprising the generator 94 driven by the device 70 and the motor 116 driving the reel 44 can be substituted for the mechanical reel drive of the apparatus of Figs. 1, 2 and 3, if desired.

The embodiments of the invention herein disclosed are merely illustrative and may be modified and departed from in many ways without departing from the spirit and scope of the invention as pointed out in and limited solely by the appended claims.

What is claimed is:

1. A strand handling apparatus comprising means to combine a plurality of strands, means to advance the combined strands, means to drive the advancing means, and means controlled by the advancing strands to vary the speed of the driving means to maintain the longitudinal speed of the strands proportional to a characteristic of the advancing strands.

2. A strand handling apparatus comprising means to intertwist a plurality of strands, means to advance the intertwisted strands, means to drive the advancing means, and means controlled by the advancing strands to vary the speed of the driving means to maintain the longitudinal speed of the strands in a substantially constant ratio to the angular speed of twisting.

3. A strand handling apparatus comprising means to intertwist a plurality of strands, means to take-up the intertwisted strands and thereby to advance the strands through the apparatus, means to drive the take-up and advancing means, and means controlled by the advancing strands to vary the speed of the driving means to maintain the longitudinal speed of the strands in a substantially constant ratio to the angular speed of twisting.

4. A strand handling apparatus comprising means to intertwist a plurality of strands, means to take-up the intertwisted strands and thereby to advance the strands through the apparatus, means to positively drive the take-up and advancing means, and means controlled by the advancing strands to vary the speed of the driving means to maintain the longitudinal speed of the strands in a substantially constant ratio to the angular speed of twisting.

5. A strand handling apparatus comprising constant speed driving means, means driven thereby to intertwist a plurality of strands at constant rotary speed of twisting, means to take-up the intertwisted strands and thereby to advance the strands through the apparatus, means to drive the take-up and advancing means, variable means to connect the take-up driving means to the constant speed driving means to be driven thereby at variable speed, and means controlled by the advancing strands to vary the variable means to maintain the longitudinal speed of the strands in a substantially constant ratio to the angular speed of twisting.

6. A strand handling apparatus comprising means to intertwist a plurality of strands, means to take-up the intertwisted strands and thereby to advance the strands through the apparatus, means to drive the take-up and advancing means, and electrical means controlled by the advancing strands to vary the speed of the driving means to maintain the longitudinal speed of the strands in a substantially constant ratio to the angular speed of twisting.

7. A strand handling apparatus comprising constant speed driving means, means driven thereby to intertwist a plurality of strands at constant rotary speed of twisting, means to take-up the intertwisted strands and thereby to advance the strands through the apparatus, means to drive the take-up and advancing means, variable means to connect the take-up driving means to the constant speed driving means to be driven thereby at variable speed, and electrical means controlled by the advancing strands to vary the variable means to maintain the longitudinal speed of the strands in a substantially constant ratio to the angular speed of twisting.

8. A strand handling apparatus comprising constant speed driving means, means driven thereby to intertwist a plurality of strands at constant rotary speed of twisting, means to take-up the intertwisted strands and thereby to advance the strands through the apparatus, means to drive the take-up and advancing means, variable means to connect the take-up driving means to the constant speed driving means to be driven thereby at variable speed, and means controlled by the advancing strands to vary the variable means to maintain the longitudinal speed of the strands in a substantially constant ratio to the angular speed of twisting, the said last named means comprising a rotatable member driven by the advancing strands, a differential device having one side thereof connected to the member to be driven thereby and having the other side thereof connected to the constant speed driving means to be driven thereby and having a member interposed between the two driven sides to be differentially driven thereby, and means to connect the differentially driven member to the variable means to vary the same.

9. A strand handling apparatus comprising constant speed driving means, means driven thereby to intertwist a plurality of strands at constant rotary speed of twisting, means to take-up the intertwisted strands and thereby to advance the strands through the apparatus, means to drive the take-up and advancing means, variable means to connect the take-up driving means to the constant speed driving means to be driven thereby at variable speed, and means controlled by the advancing strands to vary the variable means to maintain the longitudinal speed of the strands in a substantially constant ratio to the angular speed of twisting, the said last named means comprising a rotatable member driven by the advancing strands, a differential device having one side thereof connected to the member to be driven thereby and having the other side thereof connected to the constant speed driving means to be driven thereby and having a member interposed between the two driven sides to be differentially driven thereby, and electrical means to connect the differentially driven member to the variable means to vary the same.

10. A strand handling apparatus comprising constant speed driving means, means driven thereby to intertwist a plurality of strands at constant rotary speed of twisting, means to take-up the intertwisted strands and thereby to advance the strands through the apparatus, means to drive the take-up and advancing means, variable means to connect the take-up driving means to the constant speed driving means to be driven thereby at variable speed, and means controlled by the advancing strands to vary the variable means to maintain the longitudinal speed of the strands in a substantially constant ratio to the angular speed of twisting, the said last named means comprising a rotatable member driven by the advancing strands, a differential device having one side thereof connected to the member to be driven thereby and having the other side thereof connected to the constant speed driving means to be driven thereby and having a member interposed between the two driven sides to be differentially driven thereby, an electric generator driven by the differentially driven member, and an electric motor driven by the generator and coupled to the variable means to vary the same.

11. A strand handling apparatus comprising constant speed driving means, means driven thereby to intertwist a plurality of strands at constant rotary speed of twisting, means to take-up the intertwisted strands and thereby to advance the strands through the apparatus, means to drive the take-up and advancing means, variable means to connect the take-up driving means to the constant speed driving means to be driven thereby at variable speed, and means controlled by the advancing strands to vary the variable means to maintain the longitudinal speed of the strands in a substantially constant ratio to the angular speed of twisting, the said last named means comprising a rotatable member driven by the advancing strands, a differential device having one side thereof connected to the member to be driven thereby and having the other side thereof connected to the constant speed driving means to be driven thereby and having a member interposed between the two driven sides to be differentially driven thereby, an alternating current generator driven by the differentially driven member, and a synchronous electric motor driven by the generator and coupled to the variable means to vary the same.

12. In a strand handling apparatus, a flier to intertwist a plurality of strands, a reel to take-up the intertwisted strands and thereby to advance the strands through the apparatus, a main driving member driving the flier, a variable transmission driven by the driving member and driving the reel, and a differential device driven by the driving member and by the advancing strands and operative to vary the transmission.

13. In a strand handling apparatus, a flier to intertwist a plurality of strands, a reel to take-up the intertwisted strands and thereby to advance the strands through the apparatus, a main driving member driving the flier, a variable transmission driven by the driving member, an alternating current generator driven by the transmission, and a synchronous motor driven by the generator and driving the reel.

14. In a strand handling apparatus, a flier to intertwist a plurality of strands, a reel to take-up the intertwisted strands and thereby to advance the strands through the apparatus, a main driving member driving the flier, a variable transmission driven by the driving member, an alternating current generator driven by the transmission, a synchronous motor driven by the generator and driving the reel, and a differential device driven by the driving member and by the advancing strands and operative to vary the transmission.

15. In a strand handling apparatus, a flier to intertwist a plurality of strands, a reel to take-up the intertwisted strands and thereby to advance the strands through the apparatus, a main driving member driving the flier, a variable transmission driven by the driving member and driving the reel, a differential device driven by the driving member and by the advancing strands, an alternating current generator driven by the differential, and a synchronous motor driven by the generator and operative to vary the transmission.

16. In a strand handling apparatus, a flier to intertwist a plurality of strands, a reel to take-up the intertwisted strands and thereby to advance the strands through the apparatus, a main driving member driving the flier, a variable transmission driven by the driving member, an alternating current generator driven by the transmission, a synchronous motor driven by the generator and driving the reel, a differential device driven by the driving member and by the advancing strands, a second alternating current generator driven by the differential, and a second synchronous motor driven by the generator and operative to vary the transmission.

17. In a strand handling apparatus, means to intertwist a plurality of strands, means to take-up the strands and thereby to advance the strands through the apparatus, main driving means driving the intertwisting means, a variable transmission driven by the driving means and driving the take-up means, a differential device driven by the driving means and by the advancing strands, an alternating current generator driven by the differential, and a synchronous motor driven by the generator and operative to vary the ransmission.

18. In a strand handling apparatus having a flier to intertwist strands which flier comprises a sheave over which the strands pass, and having unitary means to advance the strands through the apparatus and to take-up the strands, auxiliary means to advance the strands comprising means to drive the sheave.

19. In a strand handling apparatus having a flier to intertwist strands which flier comprises a sheave over which the strands pass, and having means to advance the strands through the apparatus, auxiliary means to advance the strands comprising a booster drive for the sheave.

LESTER O. REICHELT.